(12) United States Patent
Shah

(10) Patent No.: US 8,559,427 B2
(45) Date of Patent: Oct. 15, 2013

(54) EFFICIENT WAY TO MANAGE HOST SUBSCRIPTION STATE ON A PROXY DEVICE

(75) Inventor: Kunal R. Shah, Mountain View, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 351 days.

(21) Appl. No.: 13/035,741

(22) Filed: Feb. 25, 2011

(65) Prior Publication Data

US 2012/0218997 A1 Aug. 30, 2012

(51) Int. Cl.
*H04L 12/28* (2006.01)
*H04L 12/56* (2011.01)

(52) U.S. Cl.
USPC ............................. 370/390; 370/401; 370/432

(58) Field of Classification Search
USPC .................... 370/432, 401, 390–392
See application file for complete search history.

(56) References Cited

U.S. PATENT DOCUMENTS

| | | | | |
|---|---|---|---|---|
| 6,611,528 B1* | 8/2003 | Farinacci et al. | ............ | 370/432 |
| 7,120,683 B2* | 10/2006 | Huang | ............ | 709/223 |
| 7,333,488 B2* | 2/2008 | Sumiyoshi | ............ | 370/390 |
| 7,417,990 B2* | 8/2008 | Ikeda et al. | ............ | 370/390 |
| 7,983,205 B1* | 7/2011 | Blease et al. | ............ | 370/312 |
| 8,054,766 B2* | 11/2011 | Bou-Diab et al. | ............ | 370/270 |
| 8,375,414 B2* | 2/2013 | Covey | ............ | 725/95 |
| 2002/0046271 A1* | 4/2002 | Huang | ............ | 709/223 |
| 2004/0158872 A1* | 8/2004 | Kobayashi | ............ | 725/120 |
| 2005/0195816 A1* | 9/2005 | Sumiyoshi | ............ | 370/390 |
| 2006/0072572 A1* | 4/2006 | Ikeda et al. | ............ | 370/390 |
| 2007/0147374 A1* | 6/2007 | Lee et al. | ............ | 370/390 |
| 2010/0005499 A1* | 1/2010 | Covey | ............ | 725/109 |
| 2010/0046516 A1* | 2/2010 | Fernandez Gutierrez | .... | 370/390 |

OTHER PUBLICATIONS

Cain, B., et al., "Internet Group Management Protocol, Version 3", http://www.ietf.org/rfc/rfc3376.txt; Oct. 2002, 50 pages.
Fenner, B., et al., "Internet Group Management Protocol (IGMP)/Multicast Listener Discovery (MLD)-Based Multicast Forwarding (IGMP/MLD Proxying)", *Network Working Group, Standards Track*, Aug. 2006, 12 pages.

* cited by examiner

*Primary Examiner* — Chuong T Ho
(74) *Attorney, Agent, or Firm* — Blakely, Sokoloff, Taylor & Zafman

(57) ABSTRACT

In a proxy for an upstream multicast router using IGMP or MLD, a process efficiently and scalably manages an interface between the upstream multicast router and the proxy by tracking a subset of multicast sources from the plurality of multicast sources required by an aggregate state of the plurality of multicast subscriber nodes. The tracking uses an interface tracking table for determining the aggregate state for the interface instead of a forwarding information base (FIB) and membership database that tracks more specific data detailing each multicast source required by each multicast subscriber node. The process receives an IGMP or MLD membership report with at least one change in the set of multicast sources to be received on the interface, updates the interface tracking table to reflect the at least one change in the subset of multicast sources and notifies the upstream multicast router of the at least one change.

16 Claims, 9 Drawing Sheets

| Type = 0x22 | Reserved | Checksum | } 301 |
|---|---|---|---|
| Reserved | | Number of Group records | |
| Group record 1 | | | |
| Group record 2 | | | } 303 |
| · | | | |
| · | | | |
| · | | | |

FIG. 3A

| | Record type | Aux data len | Number of sources |
|---|---|---|---|
| 305 { | | | |
| | Group address | | |
| | Source 1 | | |
| | Source 2 | | |
| 307 { | · | | |
| | · | | |
| | · | | |
| | Aux data | | |

FIG. 3B

EFFICIENT WAY TO MANAGE HOST SUBSCRIPTION STATE ON A PROXY DEVICE

FIELD OF THE INVENTION

The embodiments of the invention relate to a method and system for improving the efficiency and scalability of multicast subscriber management at a downstream proxy device. Specifically, the embodiments of the invention relate to the use of an interface tracking table to manage the aggregate state of the interface between the downstream proxy device and an upstream multicast router in regard to the multicast sources that the aggregate of the multicast subscriber nodes require.

BACKGROUND

Proxy devices are used in multicast networks to manage the forwarding and blocking of multicast sources between a set of multicast subscriber nodes and an upstream multicast router. The upstream multicast router is either in direct connection with multicast sources or an intermediate device indirectly connected to the multicast sources that provides content to a set of multicast subscriber nodes. The proxy device is a level two (L2) device that manages a membership database for a multicast group. Management of a membership database is described in RFC 4605. The proxy device uses the membership data to request that the upstream multicast router forward or block traffic for each multicast source. RFC 4605 recommends that in maintaining the membership data base that the proxy device use merging rules that are described in section 3.2 of RFC 3376 (for IPv4) or section 4.2 of RFC 3810 (for IPv6). These referenced sections describe a manner in which an aggregate state of the membership for a multicast group on an interface between the proxy device and upstream multicast router using Internet Group Management Protocol version 3 (IGMPv3) or Multicast Listener Discovery version 2 (MLDv2) can be maintained. When the membership state for the same multicast group on different sides of the interface is different, this aggregate state can be used to manage the interface.

For IGMPv3 and MLDv2, the membership state in a multicast group can be in an include or an exclude mode. The aggregate state can be derived based on the information received in the multicast membership reports from the multicast subscriber nodes. Multicast subscriber nodes identify in their reports the multicast sources they require traffic from (i.e., those sources that are forwarded) and those multicast sources that they do not require traffic from (i.e., those sources that are blocked). In the include mode, traffic from only the sources requested by the multicast subscriber node will be forwarded for a multicast group. In the exclude mode, traffic from all the sources except those specifically being requested by the multicast subscriber node will be forwarded for the multicast group. However, if there are multiple applications or sockets on an interface that are in a mixture of include and exclude modes, the interface needs to aggregate this state so as to be able to serve all the subscriber nodes correctly.

Section 3.2 of RFC 3376 describes a method for calculating the aggregate state. However, this process requires going through all of the multicast sources that are being excluded to determine common sources for excluding and then subtracting all the sources that are being explicitly included from the list of commonly excluded sources. This process of managing the membership database on a proxy device is not efficient and cannot be scaled. The number of interfaces (for example, subscriber circuits on a multi-bond interface of a smart edge device) can be on the order of thousands of interfaces. Any change in a multicast group membership state on a single circuit requires reprocessing the group membership state of all the circuits in order to come to the new aggregate state of the multi-bond interface. This method is processor intensive for the proxy device and delays the computation of the new aggregate state of the interface. Also, while the aggregate state based on all of the circuits is being reprocessed any change in the state of an already processed circuit will further require reprocessing. This can happen frequently as the membership reports from the multicast subscriber nodes can change state frequently. For example, in certain embodiments, the multicast subscriber nodes are set top boxes managing Internet Protocol Television (IPTV) that generate frequent channel changes where each channel corresponds to a multicast source.

SUMMARY

A method implemented in a network element in a wide area network, the network element functioning as a proxy for an upstream multicast router using internet group management protocol (IGMP) or Multicast Listener Discovery (MLD) to provide a plurality of multicast sources to a plurality of multicast subscriber nodes, the plurality of multicast subscriber nodes in communication with the network element, the method to efficiently and scalably manage an interface between the upstream multicast router and the proxy by tracking a subset of multicast sources from the plurality of multicast sources required by an aggregate state of the plurality of multicast subscriber nodes, the tracking using an interface tracking table for determining the aggregate state for the interface instead of a forwarding information base (FIB) and membership database that tracks more specific data detailing each multicast source required by each multicast subscriber node, the method comprising the steps of: receiving an IGMP or MLD membership report by the network element from a first of the plurality of multicast subscriber nodes, the IGMP or MLD membership report indicating at least one change in the set of multicast sources to be received by the first multicast subscriber node on the interface between the network element and the upstream multicast router; updating the interface tracking table to reflect the at least one change in the subset of multicast sources, the interface tracking table corresponding to the interface between the network element and the upstream multicast router and maintaining the aggregate state of the plurality of multicast subscriber nodes, the aggregate state defining the subset of multicast sources to be forwarded to or blocked from the plurality of multicast subscriber nodes; and notifying the upstream multicast router of the at least one change in the subset of multicast sources to be forwarded to or blocked from the network element based on the updating of the interface tracking table, the updating of the interface tracking table being independent of the updating of the FIB and membership database that maintains multicast sources to be forwarded and blocked for each multicast subscriber node.

A network element configured to function as a proxy for an upstream multicast router using internet group management protocol (IGMP) or Multicast Listener Discovery (MLD) to provide a plurality of multicast sources to a plurality of multicast subscriber nodes, the plurality of multicast subscriber nodes to be coupled in communication with the network element, the network element to efficiently and scalably manage an interface with the upstream multicast router by tracking a subset of multicast sources from the plurality of multicast sources required by an aggregate state of the plurality of multicast subscriber nodes, the tracking using an interface tracking table for determining the aggregate state for the interface instead of a forwarding information base (FIB) and membership database that tracks more specific data detailing each multicast source required by each multicast subscriber node, the network element comprising an ingress module configured to receive data packets over a network connection between the network element and the upstream multicast router; an egress module configured to transmit data packets over to the plurality of multicast subscriber nodes; an a network processor communicatively coupled to the ingress module and egress module, the network processor configured to execute an IGMP module or MLD module, the IGMP module or MLD module configured to process IGMP packets or MLD packets and to update the FIB and the membership database that tracks multicast sources required by each of the plurality of multicast subscriber nodes, the IGMP packets or MLD packets including IGMP or MLD membership reports that indicate changes to which of the plurality of multicast sources are required by each of the plurality of multicast subscriber nodes, the IGMP module or MLD module including an aggregation management module, the IGMP module or MLD module configured to provide the changes to the aggregation management module and to update the FIB and membership database, the aggregation management module configured to update an interface tracking table, based on the changes identified after the IGMP or MLD membership reports are processed, for the interface with the upstream multicast router to maintain the aggregate state and the aggregation management module configured to notify the upstream multicast router of changes in the aggregate state, wherein the aggregate state defines the subset of multicast sources to be forwarded to or blocked from the plurality of multicast subscriber nodes.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 3A and 3B are a diagrams of one embodiment of an IGMP membership report and group record.

DETAILED DESCRIPTION

Figures 1, 4:
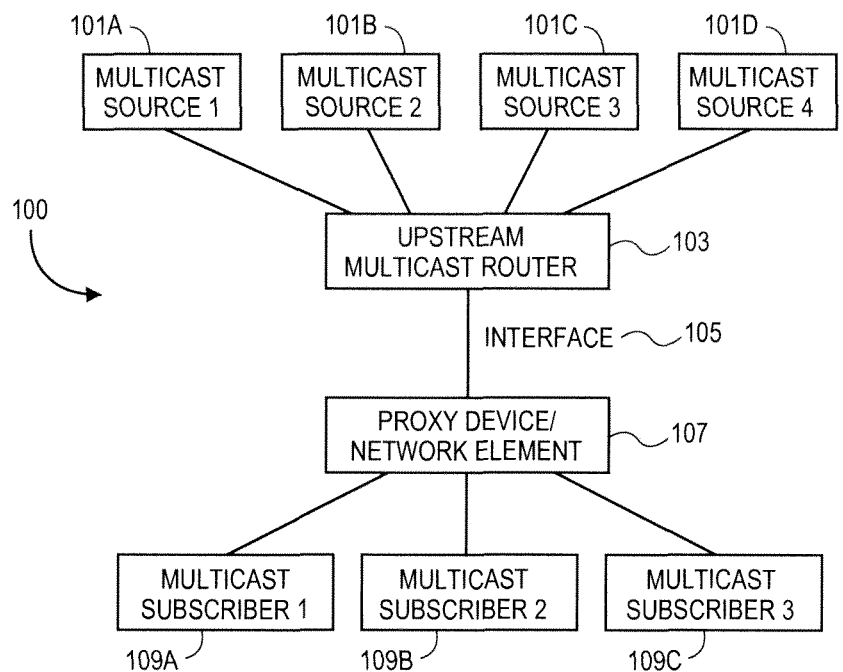
FIG. 1 is a diagram of one embodiment of a multicast network.
FIG. 4 is a diagram of one embodiment of an interface tracking table.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the flow diagrams will be described with reference to the exemplary embodiments of FIGS. 1-4. However, it should be understood that the operations of the flow diagrams can be performed by embodiments of the invention other than those discussed with reference to FIGS. 1-4, and the embodiments discussed with reference to FIGS. 1-4 can perform operations different than those discussed with reference to the flow diagrams of FIGS. 5, 6A, 6B and 7A-C.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art include lack of scalability and inefficient use of processor resources. The prior method of tracking the aggregate state of an interface required processing the entire membership database to determine all excluded and included sources for all circuits bound to that interface. This process may not complete before further changes occur due to the time required. Thus, the prior method of tracking the aggregate state was not efficient and processing the large amount of data in the membership database required significant processor time and system memory.

The embodiments of the invention overcome these disadvantages of the prior art. Instead of processing the entire membership database to determine an aggregate state of an interface, the embodiments track the state of the interface in an interface tracking table which is a simplified scoreboard that tracks a number of subscriber nodes requiring each multicast source instead of detailed information about each subscription circuit as maintained in the membership records. As a result, the upstream multicast router can be sent an update for the interface more quickly and with few resources utilized.

FIG. 1 is a diagram of one embodiment of a multicast network. The multicast network 100 includes a plurality of multicast sources 101A-D, a multicast router 103, a proxy device 107 and a set of multicast subscribers 109A-C. In other embodiments, other intermediate devices or other multicast routers and proxy devices can be part of the network in between the multicast sources and the multicast subscribers. The illustrated embodiment is presented by way of example and for sake of clarity, additional devices and variations have not presented. One skilled in the art would understand that the principles and structures described herein in regard to this embodiment would be applicable to other embodiments.

Each of the multicast sources 101A-D can be provided by any type of computing device such as a server, desktop computer, laptop computer, portable device or similar device. The multicast sources 101A-D can each be provided by separate devices or by any combination of devices including a single device. The multicast sources 101A-D are content provided by applications running on these devices that can be obtained by any of a plurality of multicast subscribers. The multicast sources are available through a multicast group address using IGMP or MLD or similar protocol. The provided content can be video content, audio content or similar types of content. In one example embodiment, each multicast source is a television channel in an IPTV system.

The upstream multicast router 103 can be any type of networking element including an edge router or similar type of routing device. The upstream multicast router can be directly or indirectly connected to each of the multicast sources over a network. The upstream multicast router 103 provides these multicast sources 101A-D to each of the downstream devices connected to the upstream multicast router. In an example embodiment, a single proxy device 107 is shown, however, the upstream multicast router 103 can have any number of connections to downstream devices. Each of these connections would be a separate interface between the upstream multicast router 103 and the downstream device. The upstream multicast router 103 maintains a membership database for each of the downstream devices connected to the upstream multicast router 103. This membership database tracks each of the connected devices' requested multicast sources 101A-D and appropriately forwards or blocks the multicast sources 101A-D as required by the downstream devices. In one embodiment, the downstream device can be the network element functioning as the proxy device 107. The upstream multicast router 103 can be connected to the proxy device 107 by a network.

The proxy device 107 is connected to the upstream multicast router 103 by a network and is either directly or indirectly coupled to the plurality multicast subscribers 109A-C over the same or another network. The proxy device 107 manages the forwarding or blocking of each of the multicast sources 101A-D provided by the upstream multicast router 103 to the multicast subscribers 109A-C. The proxy device 107 maintains an aggregate state of the requested and blocked multicast sources for its interface 105 with the upstream multicast router 103. This aggregate state is maintained in an interface tracking table. The proxy device 107 can maintain separate interface tracking tables for each interface with an upstream multicast router or with any number of upstream multicast routers. The proxy device 107 can have separate interfaces with an upstream multicast router or with other devices based on separate multicast groups, each tied to separate sockets. The proxy device 107 notifies the upstream multicast router 103 of the required set of multicast sources 101A-D and forwards the multicast sources onto the appropriate multicast subscriber nodes 109A-C.

Multicast subscriber nodes 109A-C can be any type of computing devices that include set top boxes, laptops, handhelds, desktops and similar computing devices that consume the multicast sources 101A-D. In one example embodiment, the multicast subscribers nodes are set top boxes for an IPTV system or a similar system. In this embodiment, the multicast sources are IPTV channels and the multicast subscriber can manage the set of requested channels which can change frequently based on the user interaction with the set top box. The multicast sources 101A-D, upstream router 103, proxy device 107 and subscriber nodes 109A-C can be in communication with each other over any combination of networks including local area networks (LANs), wide are networks (WANs), such as the Internet, or similar communication systems. These networks can include any combination of wireless and wired components and network elements.

Figure 2:
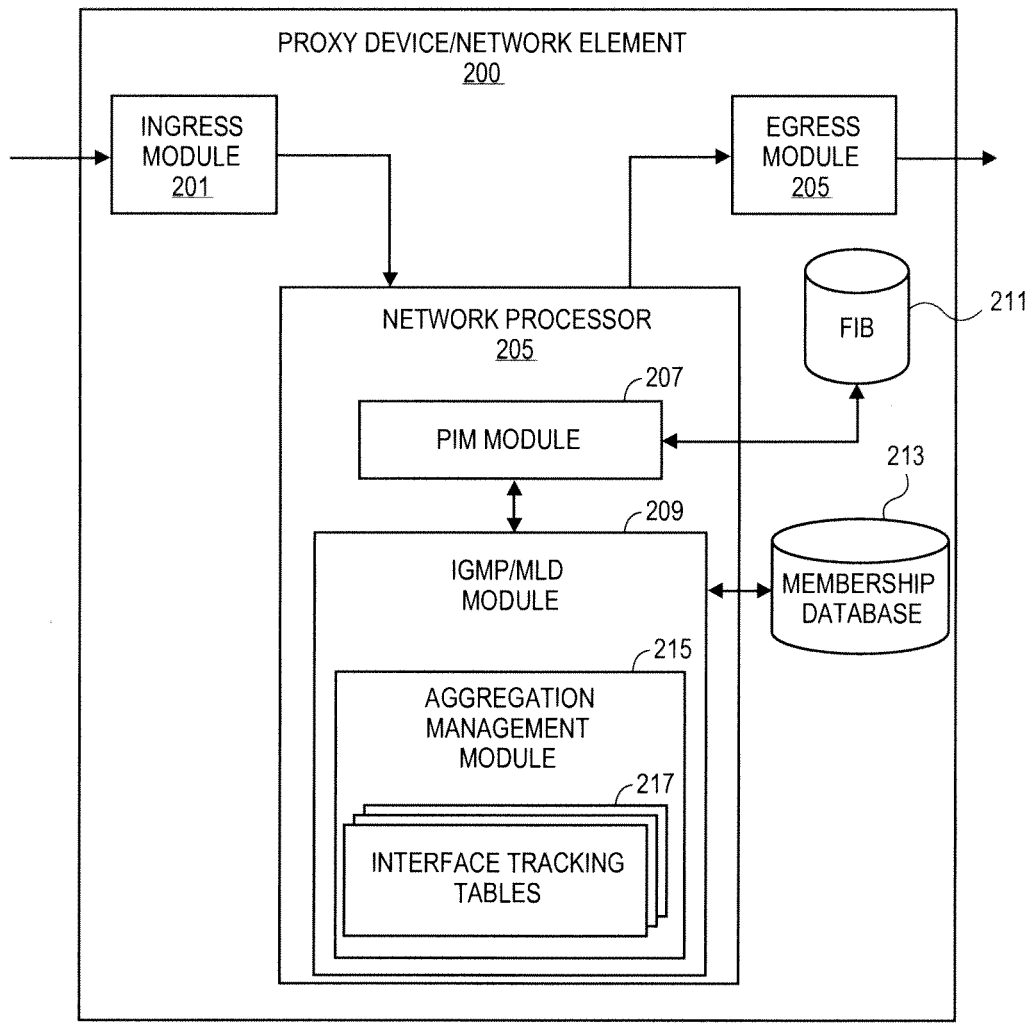
FIG. 2 is a diagram of one embodiment of a proxy device.

FIG. 2 is a diagram of one embodiment of a network element functioning proxy device. The network element 200 can include an ingress module 201, an egress module 205 and a network processor 203. The ingress module 201 can handle the processing of data packets being received by the network element at the physical link and data link level. The egress module 205 handles the processing and data packets being transmitted by the network element at the physical link and data link level. The network processor 203 handles the routing, forwarding and higher level processing of the data traffic. The network processor 203 can execute or include a Protocol Independent Multicast (PIM) module 207, and an Internet Group Management Protocol (IGMP)/Multicast Listener Discover Module 209.

The IGMP/MLD module 209 manages the membership database 213 and may manage a forwarding information base 211 (FIB). In other embodiments, the PIM module 207 may manage the FIB 211 or the PIM module 207 and IGMP/MLD module 209 manage the FIB in combination. The IGMP/MLD module 209 includes an aggregation management module 215. The IGMP/MLD module 209 receives IGMP and MLD packets that include membership reports from the downstream multicast subscriber nodes. These membership reports are analyzed to determine changes in the membership data and to update the membership database 213 and FIB 211. Examples of the format of the membership reports for IGMP membership reports and group records are shown in FIGS. 3A and 3B. The IGMP/MLD module 209 detects changes in the membership state, which are passed to the aggregation management module 215. The IGMP/MLD module 209 can analyze the type of records being received and determine the type of changes and provide this information to the aggregation management module 215. The IGMP/MLD module 209 passes the changes to the multicast membership data to the upstream multicast router. In one embodiment, the IGMP/MLD module 209 passes these changes to the PIM module 207, which sends them to the upstream multicast router. The changes are received from the aggregation management module 215 and are not directly determined from the membership database 213.

The aggregation management module 215 receives an indicator of data changes to membership data from the IGMP/MLD module 209 and then updates the interface tracking tables 217 accordingly. This process is done in parallel with the IGMP/MLD module 209 updating the forwarding information base 211 and membership database 213. The updating of the interface tracking tables 217 maintains an aggregate state of the interface corresponding to each table. Since each table only tracks the overall numbers of includes and excludes for each source as well as for a generic 'all sources' for a corresponding interface, it can be updated quickly and used as a basis for notifying the upstream multicast router of the detected changes. In contrast, since the IGMP/MLD module 209 must maintain the specific relationship between each of the multicast subscriber nodes and the multicast sources in detail in the membership records of the membership database, using this data to update the aggregate state is not efficient or scalable.

FIGS. 3A and 3B are a diagram of one embodiment of an IGMP membership report (FIG. 3A) and group record (FIG. 3B). The standard IGMPv3 report includes a header 301 with a Type field, two Reserved fields, a Checksum field, and a number of group records field. The body of the message includes a set of group records. The individual group records (FIG. 3B) include a header section 305 and body section 307. The header section includes a Record Type field, Auxiliary Date Length field, Number of Sources field and Group Address field. The body contains a set of source identifiers such as IP addresses for the end stations or servers that provide the source data. This complicated layered structure requires a the IGMP module to parse the message to identify the source identifiers in the message and to maintain a source state based on these source identifiers.

This message is provided by way of example to illustrate the membership data being received and processed at the proxy device. Similar data is received from MLD membership reports when a subscriber mode is using Internet Protocol v6 to communicate with the proxy device. Also, the aggregation process is compatible with other membership management systems including the system, method and messages of co-pending patent application Ser. No. 12/558,365 entitled Light Host Management Protocol on Multicast Capable Router filed on Sep. 11, 2009 which is incorporated herein by reference.

FIG. 4 is a diagram of one embodiment of an interface tracking table. The illustrated tracking table is provided by way of example with an example data set stored within the interface tracking table 400. The interface tracking table 400 tracks the number of requests for each of the multicast sources 401. In the illustrated embodiment, each of the current known sources for the interface listed is in the top row, wherein an 'all sources' is represented by $S_0$. Each of the other individual sources is represented by $S_{1-n}$. Thus, each of the columns tracks the multicast source identified and correlates the upstream router state and aggregate subscriber state by mode for each of the multicast sources.

The second row in the table 400 is the upstream router state for each source 403, which is either in a forwarding (F) or prune (P) mode. A forwarding mode indicates that the corresponding multicast source is being forwarded to the proxy device by the upstream multicast router and ultimately to at least one subscriber node. The pruned state indicates that the upstream multicast router is not sending the corresponding multicast source to the proxy device and the corresponding multicast source is not being sent to any subscriber node.

The aggregate subscriber state is tracked by mode in an include row and exclude row 405 for each multicast source. For the include mode and the exclude mode for each multicast source a counter is maintained. This state of the interface tracking table 400 can occur when two multicast subscribers exclude all but one or two sources, which as a result is tracked as a request all other sources using the 'all sources' column $S_0$. As multicast subscriber nodes change their state, the corresponding fields can be updated for the interface tracking table 400. For example, if a subscriber node specifically requests an S1 source, then the include mode value for that source may be incremented. Similarly, if a multicast subscriber that had previously excluded a source, then requests only that same source, the exclude counter may be decremented and the request all counter may also be decremented, while the corresponding include counter is incremented. This process is described in greater detail in relation to FIGS. 6A-6C.

Figure 5:
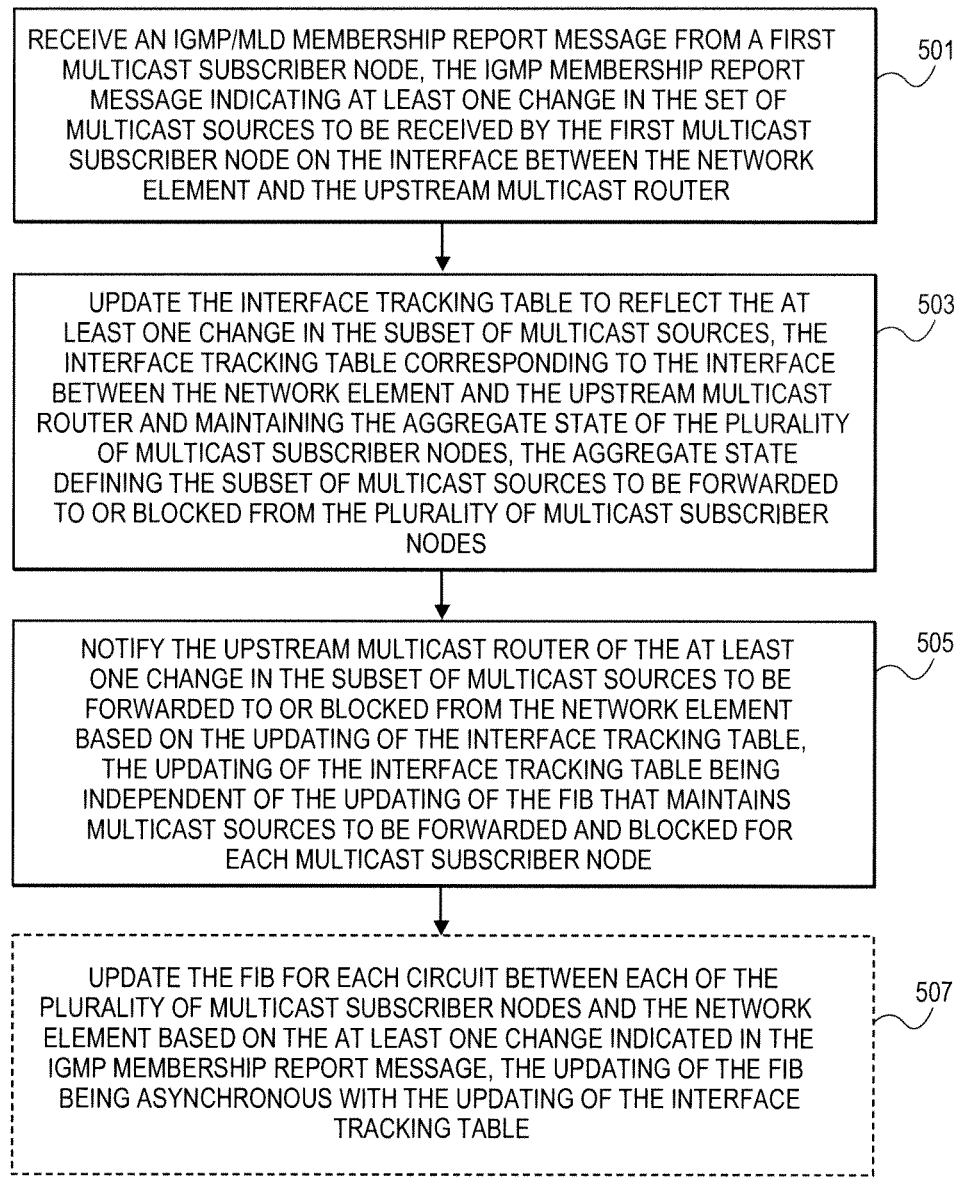
FIG. 5 is a flowchart of one embodiment of the aggregate state management process.

FIG. 5 is a flowchart of one embodiment of the overall process of maintaining an aggregate state for each interface at the proxy device. In one embodiment, the process is responsive to each change received in IGMP/MLD membership reports. Each time an IGMP membership report or MLD membership report is received from a multicast subscriber node, the report can be analyzed to determine if there are any changes in the membership database for the set of multicast sources requested for each interface with the upstream multicast routers (Block 501).

If a change is detected, then an update of the interface tracking table is made to reflect the change in the set of multicast sources being requested to be forwarded to or blocked by the set of multicast subscriber nodes (Block 503). The interface tracking table corresponding to the interface between the proxy device and the upstream multicast router is selected and the aggregate multicast source membership for the multicast subscriber nodes is updated. The aggregate multicast source membership is maintained by incrementing and decrementing the appropriate counters for the corresponding sources such that the aggregate multicast source membership state is maintained defining the multicast sources to be forwarded to or blocked from a plurality of multicast subscriber nodes.

Once the aggregate state has been updated, then the upstream multicast router is notified of the change in the aggregate state, including an indication of which multicast sources are to be forwarded or blocked on the interface with the proxy device/network element (Block 505). The updating of the aggregate state is independent of the membership database and updating of the forwarding information base. The notification can be made through the use of PIM, IGMP, MLD or similar protocols.

The IGMP module or MLD module in parallel update the forwarding information base and the membership database for each circuit between the network element and each of the multicast subscriber nodes to define the correspondence between each of the multicast subscriber nodes and each of the multicast sources using the updated data such that the proxy device can properly forward traffic to each of the multicast subscriber nodes from the upstream multicast router (Block 507). However, this process is asynchronous with the aggregate state and the updating of the upstream router such that the much slower and more detailed process of maintaining the membership records and the FIB does not slow down the updating of the interface with the upstream multicast router.

Figure 6A:
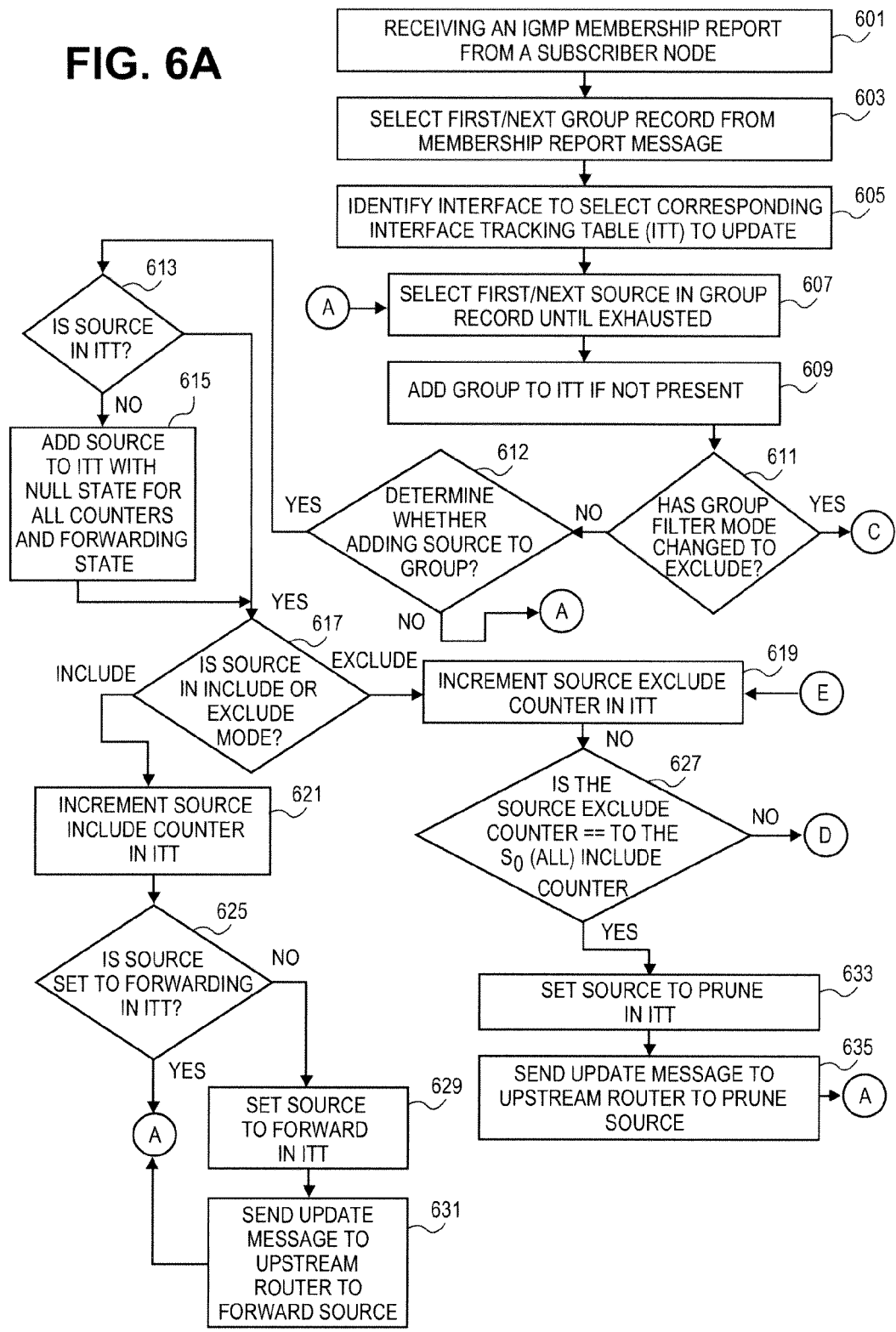
FIGS. 6A and 6B are flowcharts of one embodiment of the process of adding a source to an aggregate state using the interface tracking table.
Figure 6B:
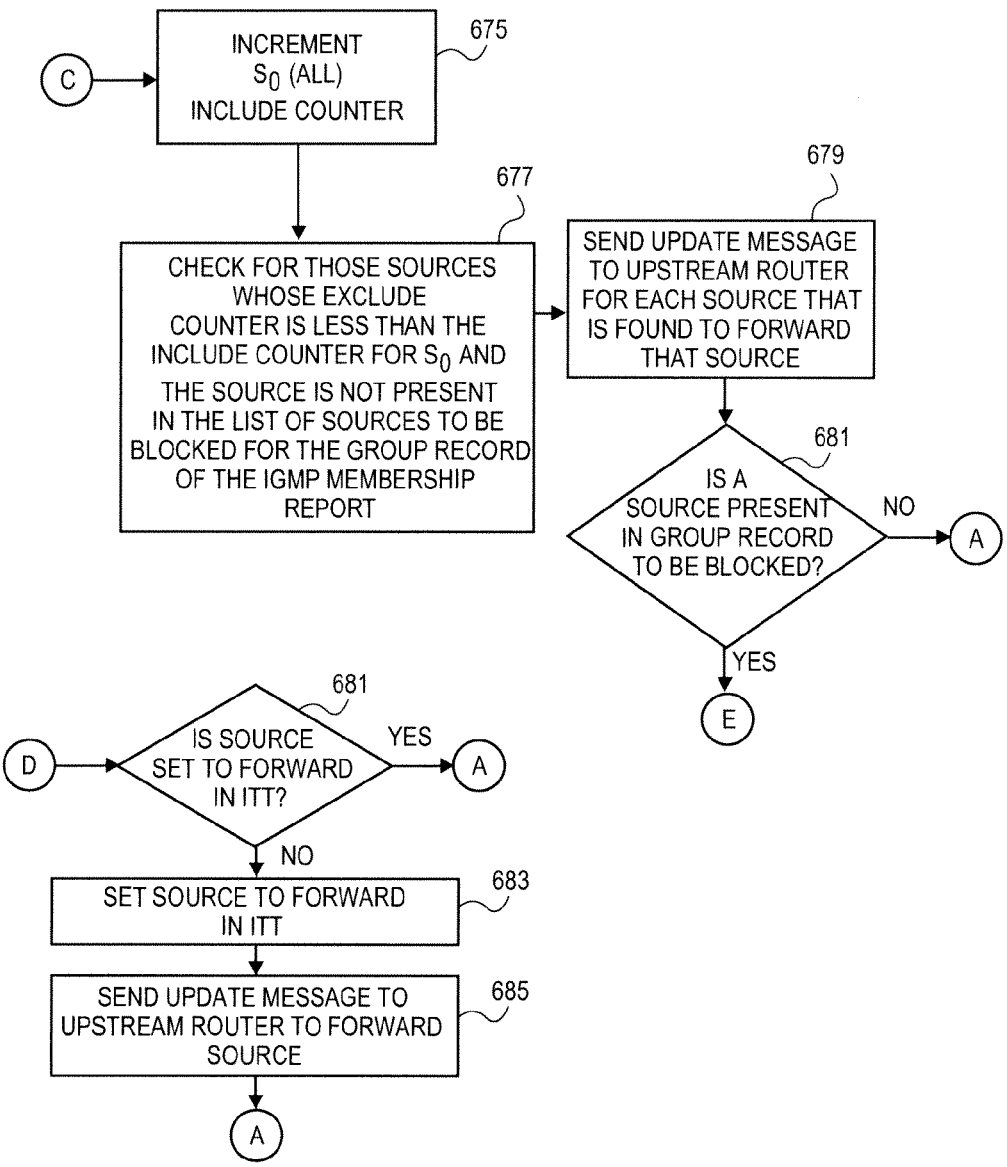

FIGS. 6A and 6B illustrate a set of flowcharts of one embodiment of the process for maintaining the interface tracking table. The process is described in relation to the processing of an IGMP membership report for sake of clarity. One skilled in the art would understand that the process can also be applied to MLD membership reports and similar multicast protocols. In one embodiment, the process is initiated by receiving an IGMP membership report from a subscriber node (Block 601). The IGMP membership report can include a set of group records that define the requested multicast sources to be sent to a particular subscriber. The process iterates through each of the group records from the membership report (Block 603) and identifies the interface that the record corresponds to (Block 605). Consequently, the correct interface tracking table is identified that is to be updated. In each group record, each set of sources is iterated through until exhausted (Block 607). Sources identify each of the multicast sources that are either being requested to be sent to or blocked for a subscriber node. When sources in a group record are exhausted then the next group record is processed (Block 603) until the group records are exhausted.

A check is performed to determine whether a group identified by a group record is being tracked by the interface tracking table. (Block 609). If the group is not present in the interface tracking table, then it is added to the interface tracking table. A check is made to determine whether a filter mode has changed from include to exclude (Block 611). If there is not a change, then a check of the membership report indicates whether sources are being added to the membership for a group (Block 612). If a source is not being added, the process continues to the next source (Block 607). If a source is being added, a check is made to determine if the source is being tracked in the interface tracking table (Block 613). The interface tracking table can be dynamic and only track those sources that have been identified as being needed to be included or excluded by any of the multicast subscriber nodes tied to an interface. If a source is not found in the interface tracking table, then the source is added to the interface tracking table and given a null state for all corresponding counters and the forwarding status (Block 615).

A check is then made to determine if the source is in an include or exclude mode (Block 617). If the source is in an include mode, then the source include counter for the corresponding source is incremented in the interface tracking table (Block 621). A check is then made to determine if the source is set to be forwarded in the interface tracking table (Block 625). If the source is set to forward, then the process continues to the next source. If the source is not set to forward, then the table is updated to set the source to forward (Block 629) and the process for initiating a sending of an update message to the upstream router to forward the source is initiated (Block 631). After the update message has been sent, then the next source is processed.

If the source has changed from an exclude mode to an include mode, then the include all sources counter is incremented (Block 675). See FIG. 6B. A check is made for those sources whose source exclude counter is less than the include counter for S0 and where the source is not present in a list of sources to be blocked for the group record of the IGMP membership report (Block 677). An update message is sent to an upstream router for each source that meets these criteria and these sources are set to forward (Block 679). A check is then made to determine if there are sources in the group record to be blocked (Block 681). If there are sources to be blocked then the process continues by incrementing the exclude counters for the source (Block 619). If not, then the process continues to the next group record or source.

Returning to FIG. 6A, if the source is in the exclude mode, then the exclude counter for the source is incremented (Block 619). A check is made to determine if the source exclude counter is greater than or equal to the include all sources counter (Block 627). If the source exclude counter is equal to the include all sources counter, then the source is set to prune in the interface tracking table (Block 633). An update message is then sent to the upstream router to prune the source (Block 635). The process continues by processing the next source.

If the source exclude counter is not equal to the include all source counter, then a check is made if the source is set to forward in the interface tracking table (Block 681). See FIG. 6B. If the source is set to forward in the interface tracking table, then the next source record is processed and nothing further is done. If the source is not set to forward in the interface tracking table, then the source is set to forward in the interface tracking table (Block 653). An update message is then sent to the upstream router to forward the source (Block 615). The process continues with the next source record. See FIG. 6B.

Figure 7A:
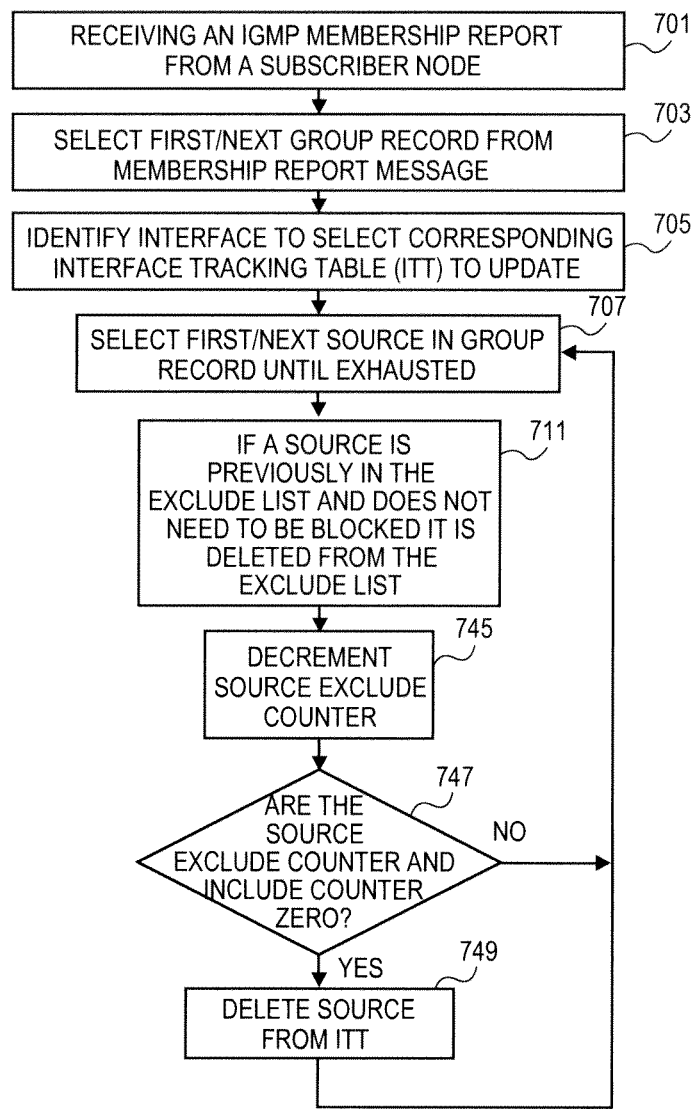
FIGS. 7A, 7B and 7C are flowcharts of one embodiment of the process of subtracting a source to an aggregate state using the interface tracking table.
Figure 7B:
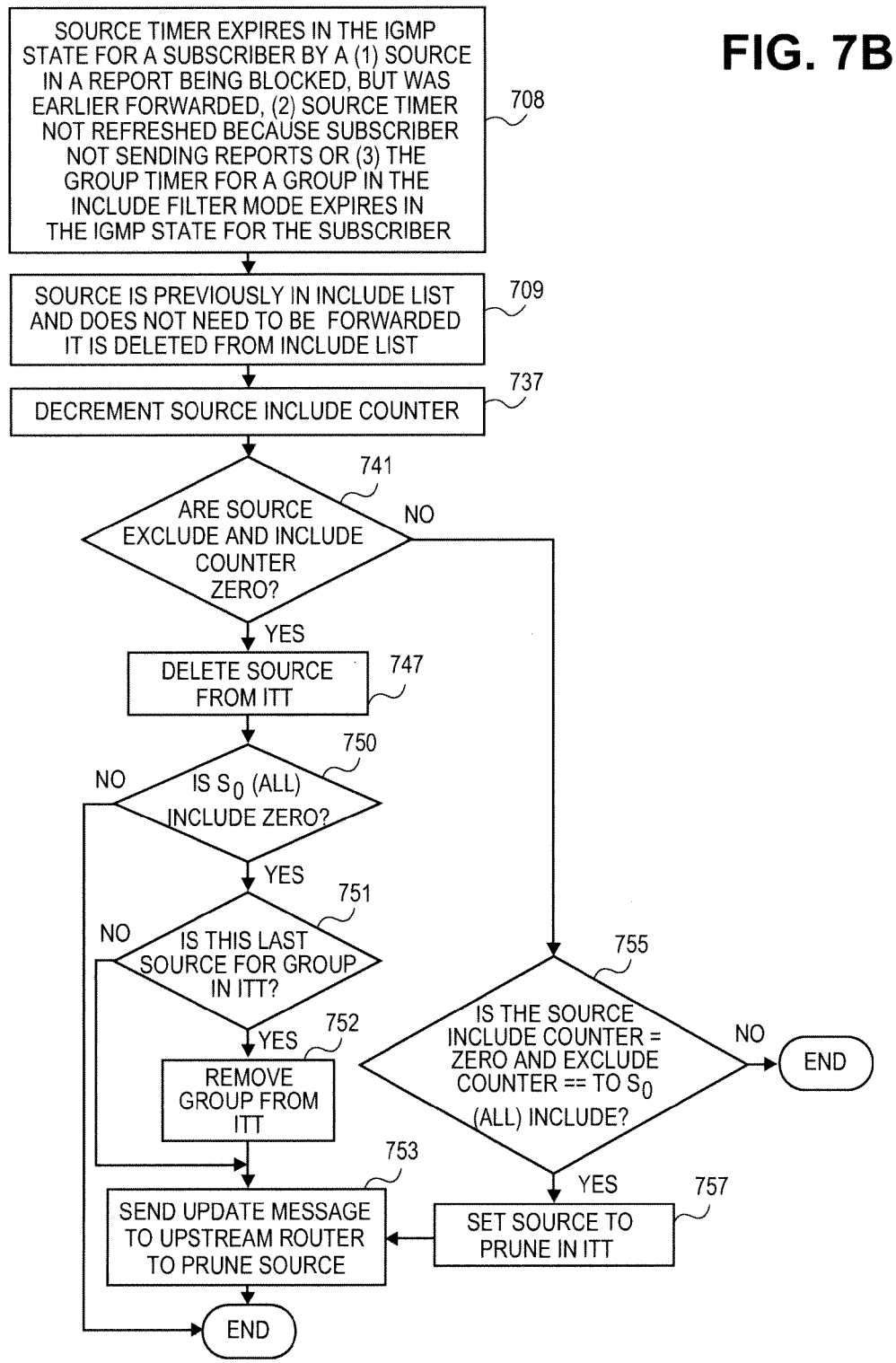
Figure 7C:
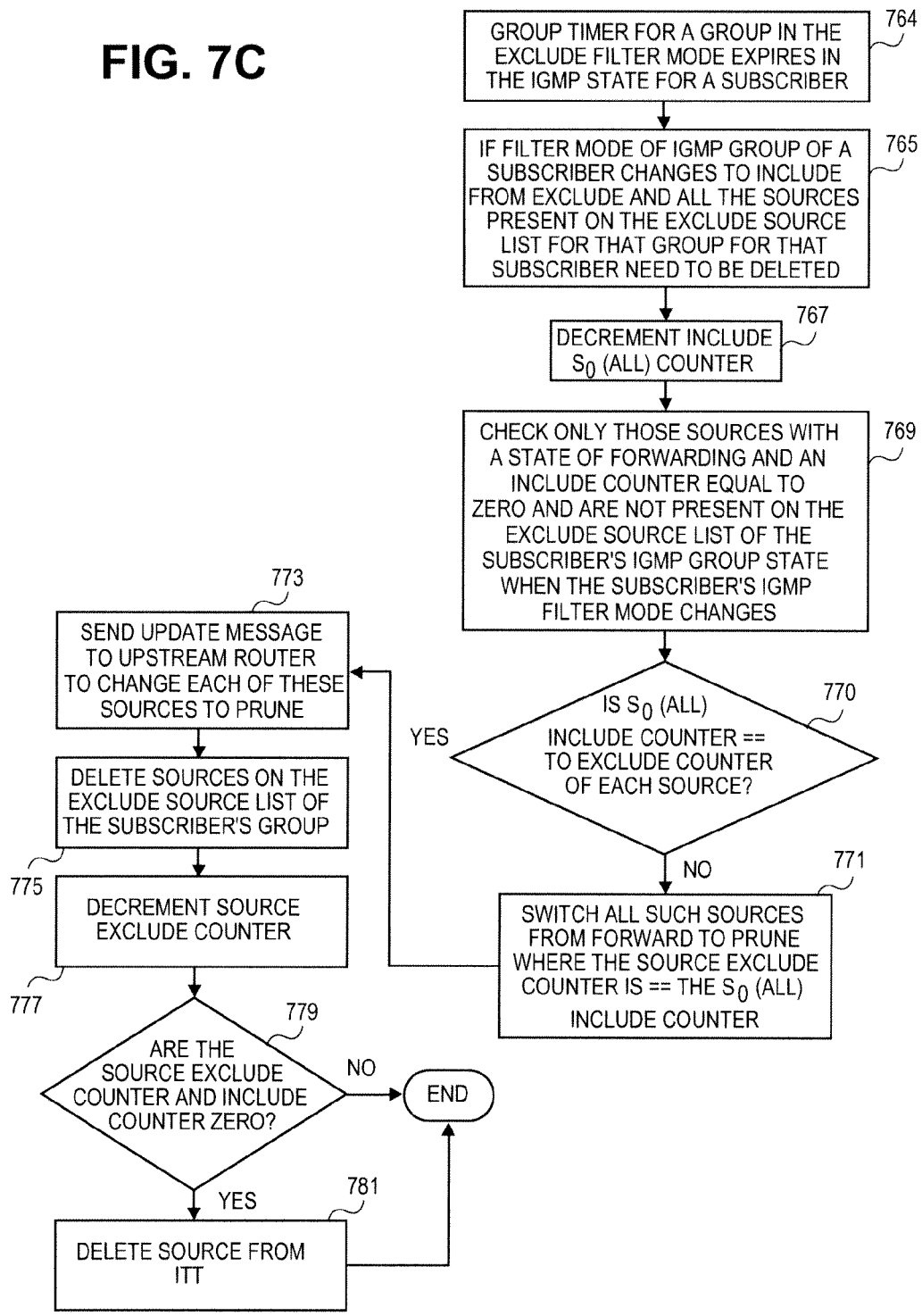

In FIGS. 7A, 7B and 7C, if the source is to be subtracted, then the process is outlined in FIGS. 7A, 7B and 7C. This process is part of the processing of an IGMP or MLD membership report and can be performed in conjunction with or separate from the processing of added sources. The example of an IGMP membership report is again provided by way of example and the principles are applicable to processing MLD membership reports and similar multicast protocols. The initial processing of the membership report is the same as for the addition of a source described above (Blocks 701-707).

A check is first made whether the source is previously in the exclude list and does not need to be block, then it is deleted from the exclude list (Block 711). Then the source exclude counter is decremented (Block 745). A check is then made to determine whether the source exclude counter and include counter are both zero (Block 747). If they are both zero, then the source is deleted from the interface tracking table (Block 749). If they are not both zero, then the process continues to the next source or group record (Blocks 703/707).

In FIG. 7B, a trigger for decrementing the include counter for a source in the ITT is when the source's timer expires in the IGMP state for a subscriber. A timer can be maintained for each source and/or source and subscriber. This scenario can occur when (1) the source in a membership report is blocked that had previously been forwarded causing the source's timer to expire, (2) the source timer is not refreshed because the subscriber is not sending any further membership reports or (3) if the group timer for an IGMP group of a subscriber in the include filter mode expires in the IGMP state for a subscriber. In this last case, all source timers will also expire (Block 708). In these cases, a check is first made to determine if a source is previously in the include list of the membership report and does not need to be forwarded. If this is found to be the case, the source is deleted from the include list (Block 709). The process then continues by decrementing the source include counter (Block 737). The process continues by checking to determine whether the source exclude and the source include counter are both zero (Block 741). If they are both zero, then the source is deleted from the interface tracking table (Block 747). A check is then made to determine if the include all sources counter is also zero (Block 750). If it is not, then the process continues on to processing the next source. If the include all sources counter is zero, then a check is made if the source is the last source in the group (Block 751). If the source is the last one in the group, then the group is removed from the interface tracking table (Block 752). An update message is then sent to the upstream router to prune the source (Block 753).

If the source include and exclude counters are not zero, then a check is made to determine if the source include counter is equal to zero and the exclude counter is equal to the include all sources counter (Block 755). If it is not, then nothing is done. If the source include counter is equal to zero and the exclude counter is equal to the include all sources counter, then the source is set to prune in the interface tracking table (Block 757). An update message is then sent to the upstream router to prune the source (Block 753). The process then ends.

FIG. 7C is a flowchart of based on a triggering condition for subtracting in the interface tracking table. In response to a triggering condition where a group timer for an IGMP group that is in the exclude filter mode expires in the IGMP state for a subscriber (Block 764), a check is made to determine if the filter mode of an IGMP group of a subscriber changes to include mode from exclude mode, then all the sources present on the exclude source list for that group for that subscriber are deleted (Block 765). Then the include all sources counter is decremented (Block 767). A check follows that only those sources with a state of forwarding and an include counter equal to zero and that are not present on the exclude source list of the subscribers IGMP group state when the subscriber's IGMP group filter mode changes. For these sources a check is then made whether the include all sources counter is equal to each source exclude counter (Block 770). A switch of all sources that are set to forward to the prune state is made where the source exclude counter equal to the include all sources counter (Block 771). An update message is then sent to the upstream router to change each of these sources to the prune state (Block 773). Any sources that are on the exclude source list of the subscriber's IGMP group state are deleted (Block 775).

Then the process continues to decrement the source exclude counter (Block 777). If there are sources with an exclude counter and an include counter that are zero (Block 779), then the source is deleted from the interface tracking table (Block 781).

In one embodiment, the system can be implemented as a set of hardware devices. In another embodiment, the system components are implemented in software (for example microcode, assembly language or higher level languages). These software implementations can be stored on a non-transitory computer-readable medium. A non-transitory "computer-readable" medium can include any medium that can store information. Examples of the computer-readable medium include a read only memory (ROM), a floppy diskette, a CD Rom, a DVD, a flash memory, a hard drive, an optical disc or similar medium.

Thus, a method, system and apparatus for efficient way to manage host subscription state on a proxy device has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method implemented in a network element in a wide area network, the network element functioning as a proxy for an upstream multicast router using internet group management protocol (IGMP) or Multicast Listener Discovery (MLD) to provide a plurality of multicast sources to a plurality of multicast subscriber nodes, the plurality of multicast subscriber nodes in communication with the network element, the method to efficiently and scalably manage an interface between the upstream multicast router and the proxy by tracking a subset of multicast sources from the plurality of multicast sources required by an aggregate state of the plurality of multicast subscriber nodes, the tracking using an interface tracking table for determining the aggregate state for the interface instead of a forwarding information base (FIB) and membership database that tracks more specific data detailing each multicast source required by each multicast subscriber node, the method comprising the steps of:

receiving an IGMP or MLD membership report by the network element from a first of the plurality of multicast subscriber nodes, the IGMP or MLD membership report indicating at least one change in the set of multicast sources to be received by the first multicast subscriber node on the interface between the network element and the upstream multicast router;

updating the interface tracking table to reflect the at least one change in the subset of multicast sources, the interface tracking table corresponding to the interface between the network element and the upstream multicast router and maintaining the aggregate state of the plurality of multicast subscriber nodes, the aggregate state defining the subset of multicast sources to be forwarded to or blocked from the plurality of multicast subscriber nodes; and notifying the upstream multicast router of the at least one change in the subset of multicast sources to be forwarded to or blocked from the network element based on the updating of the interface tracking table, the updating of the interface tracking table being independent of the updating of the FIB and membership database that maintains multicast sources to be forwarded and blocked for each multicast subscriber node.

2. The method of claim 1, further comprising the steps of:

updating the FIB and membership database for each circuit between each of the plurality of multicast subscriber nodes and the network element based on the at least one change indicated in the IGMP or MLD membership report message, the updating of the FIB and membership database being asynchronous with the updating of the interface tracking table.

3. The method of claim 1, wherein updating the interface tracking table comprises the steps of:

incrementing an include counter in the interface tracking table for a first of the subset of multicast sources in response to receiving the IGMP or MLD membership report, wherein the IGMP or MLD membership report defines an include for the first of the subset of multicast sources for the first multicast subscriber node.

4. The method of claim 1, wherein updating the interface tracking table comprises
the steps of:
incrementing an exclude counter in the interface tracking table for a first of the subset of multicast sources and an include-all-multicast-sources counter in response to receiving the IGMP or MLD membership report, wherein the IGMP or MLD membership report defines an exclude for the first of the subset of multicast sources for the first multicast subscriber node.

5. The method of claim 1, further comprising the steps of:
adding a first multicast source to the subset of multicast sources tracked in the interface tracking table in response to determining that the first multicast source is defined to be an include or an exclude in the received IGMP or MLD membership report and the first multicast source is not present in the interface tracking table.

6. The method of claim 1, further comprising the steps of:
deleting a first multicast source from the subset of multicast sources tracked in the interface tracking table in response to determining that the first multicast source has an include counter value of zero and an exclude counter value of zero.

7. The method of claim 1, wherein notifying the upstream multicast router comprises
the steps of:
sending a message to the upstream router to prune a first of the subset of multicast sources in response to detecting that an exclude counter for the first of the subset of multicast sources is equal to an include-all-multicast-sources counter in the interface tracking table.

8. The method of claim 1, wherein notifying the upstream multicast router comprises
the steps of:
sending a message to the upstream multicast router to forward a first of the subset of multicast sources in response to detecting that an include counter for the first of the subset of multicast sources changed from zero to a positive value.

9. A network element configured to function as a proxy for an upstream multicast router using internet group management protocol (IGMP) or Multicast Listener Discovery (MLD) to provide a plurality of multicast sources to a plurality of multicast subscriber nodes, the plurality of multicast subscriber nodes to be coupled in communication with the network element, the network element to efficiently and scalably manage an interface with the upstream multicast router by tracking a subset of multicast sources from the plurality of multicast sources required by an aggregate state of the plurality of multicast subscriber nodes, the tracking using an interface tracking table for determining the aggregate state for the interface instead of a forwarding information base (FIB) and membership database that tracks more specific data detailing each multicast source required by each multicast subscriber node, the network element comprising:
an ingress module configured to receive data packets over a network connection between the network element and the upstream multicast router;
an egress module configured to transmit data packets over to the plurality of multicast subscriber nodes; and
a network processor communicatively coupled to the ingress module and egress module, the network processor configured to execute an IGMP module or MLD module,
the IGMP module or MLD module configured to process IGMP packets or MLD packets and to update the FIB and the membership database that tracks multicast sources required by each of the plurality of multicast subscriber nodes, the IGMP packets or MLD packets including IGMP or MLD membership reports that indicate changes to which of the plurality of multicast sources are required by each of the plurality of multicast subscriber nodes, the IGMP module or MLD module including an aggregation management module, the IGMP module or MLD module configured to provide the changes to the aggregation management module and to update the FIB and membership database,
the aggregation management module configured to update an interface tracking table, based on the changes identified after the IGMP or MLD membership reports are processed, for the interface with the upstream multicast router to maintain the aggregate state and the aggregation management module configured to notify the upstream multicast router of changes in the aggregate state, wherein the aggregate state defines the subset of multicast sources to be forwarded to or blocked from the plurality of multicast subscriber nodes.

10. The network element of claim 9, wherein the IGMP module or MLD module is configured to update the FIB and membership database for each circuit between each of the plurality of multicast subscriber nodes and each of the plurality of multicast sources based on changes indicated in the IGMP or MLD membership reports, the updating of the FIB and membership database being asynchronous with the updating of the interface tracking table.

11. The network element of claim 9, wherein the aggregation management module is configured to update the interface tracking table by incrementing an include counter in the interface tracking table for a first of the subset of multicast sources in response to receiving the changes from the IGMP module or MLD module, wherein the IGMP or MLD membership reports define an include for the first of the subset of multicast sources for a first multicast subscriber node.

12. The network element of claim 9, wherein the aggregation management module is configured to increment an exclude counter in the interface tracking table for a first of the subset of multicast sources and to increment an include-all-multicast-sources counter in response to receiving the changes from the IGMP module or MLD module, wherein the IGMP or MLD membership reports define an exclude for the of the subset of first multicast sources for the first multicast subscriber node.

13. The network element of claim 9, wherein the aggregation management module is configured to add a first multicast source to the subset of multicast sources tracked in the interface tracking table in response to determining that the first multicast source is defined to be an include or an exclude in the received IGMP or MLD membership reports and a first multicast source is not present in the interface tracking table.

14. The network element of claim 9, wherein the aggregation management module is configured to delete a first multicast source from the subset of multicast sources tracked in the interface tracking table in response to determining that the first multicast source has an include counter value of zero and an exclude counter value of zero.

15. The network element of claim 9, wherein the aggregation management module is configured to notify the upstream multicast router of the changes by sending a message to the upstream router to prune a first of the subset of multicast sources in response to detecting that an exclude counter for the first of the subset of multicast sources is equal to an include-all-multicast-sources counter in the interface tracking table.

16. The network element of claim 9, wherein aggregation management module is configured to notify the upstream multicast router of the changes by sending a message to the upstream multicast router to forward a first of the subset of multicast sources in response to detecting that an include counter for the first of the subset of multicast sources changed from zero to a positive value.

\* \* \* \* \*

UNITED STATES PATENT AND TRADEMARK OFFICE
CERTIFICATE OF CORRECTION

PATENT NO. : 8,559,427 B2  
APPLICATION NO. : 13/035741  
DATED : October 15, 2013  
INVENTOR(S) : Shah Page 1 of 1

It is certified that error appears in the above-identified patent and that said Letters Patent is hereby corrected as shown below:

In the Drawings

In Fig. 6A, Sheet 5 of 9, for Tag "627", in Line 3, delete "= =" and insert -- $\geq$ --, therefor.

In Fig. 7B, Sheet 8 of 9, for Tag "755", in Line 2, delete "=" and insert -- = = --, therefor.

In the Specification

In Column 6, Line 41, delete "are" and insert -- area --, therefor.

In Column 8, Line 27, delete "S1" and insert -- $S_1$ --, therefor.

In the Claims

In Column 14, Line 45, in Claim 12, delete "of the subset of first multicast" and insert -- first of the subset of multicast --, therefor.

Signed and Sealed this  
Eleventh Day of March, 2014

Michelle K. Lee  
*Deputy Director of the United States Patent and Trademark Office*